(12) United States Patent
Raines et al.

(10) Patent No.: US 7,505,838 B2
(45) Date of Patent: Mar. 17, 2009

(54) SYSTEM AND METHOD FOR DETERMINING VEHICLE ODOMETER ROLLBACK

(75) Inventors: Richard T. Raines, Arlington, VA (US); Steve Korman, Bethesda, MD (US)

(73) Assignee: Carfax, Inc., Centreville, VA (US)

( * ) Notice: Subject to any disclaimer, the term of this patent is extended or adjusted under 35 U.S.C. 154(b) by 25 days.

(21) Appl. No.: 11/177,470

(22) Filed: Jul. 11, 2005

(65) Prior Publication Data

US 2006/0009885 A1   Jan. 12, 2006

Related U.S. Application Data

(60) Provisional application No. 60/586,408, filed on Jul. 9, 2004.

(51) Int. Cl.
*G05D 1/00* (2006.01)
(52) U.S. Cl. ............................................. 701/34; 701/1
(58) Field of Classification Search .................... 701/1, 701/29, 30, 33, 34, 28
See application file for complete search history.

(56) References Cited

U.S. PATENT DOCUMENTS

| | | | |
|---|---|---|---|
| 4,989,144 A | | 1/1991 | Barnett et al. |
| 5,127,005 A | | 6/1992 | Oda et al. |
| 5,598,511 A | | 1/1997 | Petrinjak et al. |
| 5,899,985 A | | 5/1999 | Tanaka |
| 5,931,878 A | * | 8/1999 | Chapin, Jr. ............... 701/30 |
| 6,052,631 A | * | 4/2000 | Busch et al. ............... 701/29 |
| 6,092,193 A | * | 7/2000 | Loomis et al. ............ 713/193 |
| 6,098,061 A | | 8/2000 | Gotoh et al. |
| 6,259,354 B1 | | 7/2001 | Underwood et al. |
| 6,370,454 B1 | * | 4/2002 | Moore ........................ 701/29 |
| 6,397,131 B1 | | 5/2002 | Busch et al. |
| 6,505,106 B1 | | 1/2003 | Lawrence et al. |
| 2002/0194051 A1 | | 12/2002 | Hall et al. |

OTHER PUBLICATIONS www.carfax.com, "CARFAX Vehicle History Report," pp. 1-9, date printed Nov. 8, 2004.
www.autocheck.com, "AutoCheck Vehicle History Reports: Free VIN Check," p. 1 of 1, date printed Jul. 14, 2004.
www.autocheck.com, "Welcome to AutoCheck," pp. 1 of 4, date printed Jul. 12, 2004.
www.autocheck.com, "Sample Reports," An AutoCheck Clean Bill of Health: 2G1WL54T4L9101564, 1990 Chevy Lumina, pp. 1 of 3, date printed Jul. 12, 2004.
www.odi.nhtsa.dot.gov, "Office of Defects Investigation," p. 1 of 1, date printed Jul. 14, 2004.
www.odi.nhtsa.dot.gov, "Office of Defects Investigation, Cars/Problems/Recalls," pp. 1 of 2, date printed Jul. 14, 2004.
www.carfax.com, "Don't buy a used car without CARFAX!," p. 1 of 1, date printed Nov. 8, 2004.

* cited by examiner

*Primary Examiner*—Mark Hellner
(74) *Attorney, Agent, or Firm*—Marc S. Kaufman; Jennifer Hayes; Nixon Peabody, LLP (57) ABSTRACT

A vehicle history information system adapted to determine vehicle odometer rollback. In one embodiment, the system includes a vehicle history report module adapted to retrieve vehicle history records associated with a particular vehicle, at least two vehicle history records having associated date information, odometer reading, and data source information. The system further includes an odometer rollback determination module adapted to analyze the vehicle history records to determine a likelihood of an odometer rollback at least partially based on the data source information.

46 Claims, 7 Drawing Sheets

Figure 1: Most likely an odometer rollback / 2

| Date | Mileage Reading | Source | Comment |
|---|---|---|---|
| 12/05/1999 | 35,984 miles | Florida DMV | |
| 04/01/2000 | 9,578 miles | Dealer Inventory, South Eastern US | Potential Odometer Rollback |
| 04/25/2000 | 10,035 miles | Georgia DMV | |

Figure 2: Probably NOT an odometer rollback – "False-positive" reading.

/ 4

| Date | Mileage Reading | Source | Comment |
|---|---|---|---|
| 12/05/1999 | 35,984 miles | Florida DMV | |
| 04/01/2000 | 9,578 miles | Dealer Inventory, South Eastern US | Odometer Rollback or Error |
| 04/25/2000 | 39,592 miles | Georgia DMV | |

Figure 5 / 4

| | Date | Mileage Reading | Source | Comment |
|---|---|---|---|---|
| Trigger Record 5 => | 12/05/1999 | 35,984 miles | Florida DMV | |
| Target Record 6 => | 04/01/2000 | 9,578 miles | Dealer Inventory, South Eastern US | Odometer Rollback or Error |
| Validating Record 7 => | 04/25/2000 | 39,592 miles | Georgia DMV | |

Detailed Vehicle History
for the 1993 SUBARU IMPREZA L AWD -- VIN: JF1GC2444PH50XXXX

/ 210

|  | Date | Mileage | Source | Comment |
|---|---|---|---|---|
| Trigger Record => <br> A DMV is classified as a B source for mileage data reliability | 10/29/1999 | 103,000 | Massachusetts Motor Vehicle Dept. Brighton, MA Title #AT596563 | Title or registration issued |
| Target Record => <br> An Auto Auction is classified as a C source for mileage data reliability | 05/04/2000 | 19,849 | Auto Auction Northeast Region | Vehicle Sold at Auction <br><br> INCONSISTENT ODOMETER READING <br><br> CARFAX Advisor™ <br> CARFAX analyzed this mileage history and is uncertain whether this reading represents a rollback or a clerical error. Please verify the mileage with your dealer or a qualified mechanic. |
| Validating Record => <br> No mileage available | 07/05/2002 |  | Massachusetts Police Report Cambridge, MA Case #1488847 | Accident Reported Vehicle involved in crash or collision |

> Rule 7 applies to this vehicle's history. This mileage discrepancy is therefore a Tier 2 Rollback. As a result, an "Inconsistent Odometer Reading" warning and the associated "CARFAX Advisor" are displayed to customers.

Figure 7

CARFAX Mileage Accuracy Check     214

*Odometer Rollback Check:*

CARFAX found no odometer rollbacks for this 1993 SUBARU IMPREZA L AWD (JF1GC2444PH50XXXX). Rollbacks reported in this section originate from readings collected by a DMV or other verifiable source.

*Mileage Consistency Check:*

CARFAX analyzed the mileage history for this 1993 SUBARU IMPREZA L AWD (JF1GC2444PH50XXXX) and found an inconsistent odometer reading. CARFAX is uncertain whether this is a rollback or a clerical error at the source. Please verify this mileage with your dealer or a qualified mechanic.

| | |
|---|---|
| Reading reported on 10/29/1999: | 103,000 miles |
| Inconsistent reading on 05/04/2000: | 19,849 miles |
| No reading available for verification: | Not available |

> Since this is a Tier 2 Rollback, the problem is flagged under the Mileage Consistency Check sub-section.
>
> The language used ("uncertain", "clerical error at the source", "check with a mechanic") expresses the lower degree of confidence CARFAX has about this being an actual rollback.

Figure 8

Detailed Vehicle History ← 220
for the 1993 CADILLAC SEVILLE STS -- VIN: 1G6KY5298PU81XXXX

| | Date | Mileage | Source | Comment |
|---|---|---|---|---|
| Trigger Record => <br> A fleet company is classified as a B source for mileage data reliability | 10/31/1995 | 37,903 | Fleet Company Southeast Region | Vehicle sold |
| Target Record => <br> A DMV is classified as a B source for mileage data reliability | 11/21/1995 | 20,335 | North Carolina Motor Vehicle Dept. Winston Salem, NC Title #1536140024 | Title or registration issued New owner reported POTENTIAL ODOMETER ROLLBACK <br><br> CARFAX Advisor™ The readings causing this rollback were collected by a DMV or other verifiable source. Please verify the mileage with your dealer or a qualified mechanic. |
| Validating Record => <br> A DMV is classified as a B source for mileage data reliability | 09/01/1998 | 75,113 | North Carolina Motor Vehicle Dept. Hickory, NC Title #773127982662023 | Title or registration issued |

Rule 2 applies to this vehicle's history. This mileage discrepancy is therefore a Tier 1 Rollback. As a result, a "Potential Odometer Rollback" warning and the associated "CARFAX Advisor" are displayed to customers.

Figure 9

CARFAX Mileage Accuracy Check                           224

*Odometer Rollback Check:*

CARFAX found a potential odometer rollback for this 1993 CADILLAC SEVILLE STS (1G6KY5298PU81XXXX). These readings were collected by a DMV or other verifiable source.

| | |
|---|---|
| Reading reported on 10/31/1995: | 37,903 miles |
| Reading reported on 11/21/1995: | 20,335 miles |
| Potential odometer rollback of: | 17,568 miles |

*Mileage Consistency Check:*

CARFAX found no other inconsistent odometer readings in the mileage history of this 1993 CADILLAC SEVILLE STS (1G6KY5298PU81XXXX).

> Since this is a Tier 1 Rollback, the problem is flagged under the Odometer Rollback Check sub-section.
>
> The language used ("potential odometer rollback", "collected from [...] verifiable sources'") expresses the higher degree of confidence CARFAX has about this being an actual rollback.

SYSTEM AND METHOD FOR DETERMINING VEHICLE ODOMETER ROLLBACK

This application claims priority to U.S. Provisional Application No. 60/586,408, filed Jul. 9, 2004, the contents of which are incorporated herein by reference.

BACKGROUND OF THE INVENTION

1. Field of the Invention

The present invention is directed to a system and method for automatically determining vehicle odometer discrepancies and, in particular, odometer rollback. The present invention is specifically directed to such a system and method in which the likelihood of a rollback is determined.

2. Description of the Related Art

Consumers and automotive professionals involved in the trading of used vehicles recognize the importance of information relating to a used vehicle's history in making a purchasing decision including placing a value on a particular vehicle. Consequently, services have been created that function primarily to provide vehicle history information to various parties in the used vehicle market, including dealers and individual consumers. A web site is typically provided which permits a potential buyer of a vehicle to purchase a vehicle history report containing an extensive collection of information on a particular vehicle. For example, the vehicle history report may include such vehicle information as model year, odometer readings and discrepancies, ownership records, accident information, the existence of salvage and/or flood titles, and maintenance records, such information being typically presented as a series of vehicle history records in a vehicle history report.

Automobile buyers and sellers in the resale market consider the number of miles or kilometers a vehicle has been driven to be, for many purposes, a valuable element of historical information. For example, CARFAX, Inc., the assignee of the present application, provides a vehicle history information system that generates vehicle history reports (which may be generated by the method and system originally described and claimed in U.S. Pat. No. 4,989,144, the entire contents of which is hereby incorporated by reference), and presents the user with odometer readings for a particular vehicle in its database. This feature permits the system to alert a user to odometer discrepancies as "odometer rollbacks".

As part of its vehicle history service, CARFAX reports potential odometer rollbacks to its customers. Rollbacks are a form of fraud whereby a person lowers the mileage or kilometers displayed by the odometer of a vehicle using a tool or software. By doing so, the person artificially and fraudulently increases the value of a vehicle. Rollbacks are detected and reported by CARFAX in its vehicle history reports by comparing two chronologically sequential odometer readings present in respective vehicle history records. The first mileage reading should always be equal to, or lower than, the second odometer reading. If the first odometer reading is higher than the second odometer reading, the odometer of the vehicle may have been tampered with and roll backed.

SUMMARY OF THE INVENTION

A problem that arises, however, is that as more data sources are added to the database, along with an increased number of odometer readings collected in a variety of ways, the more problematic it becomes to reliably label a vehicle with an odometer discrepancy as an odometer rollback. Different sources of odometer readings have different levels of reliability. Indeed, the mileage information received by state Department of Motor Vehicles is typically deemed highly accurate, as vehicle owners must sign an affidavit certifying the accuracy of the vehicle's mileage when selling a used vehicle (Truth-In-Mileage Act). On the other hand, some state emission inspections' odometer readings are particularly unreliable. This is due, in part, because capturing accurate mileage information at inspection time is seen as a low priority by inspection stations staff, and thus, not accurately documented.

The problem is that these less accurate mileage readings tend to trigger a disproportionate amount of "false-positive" odometer rollbacks in vehicle history reports, i.e., the vehicle history report states that there is a potential odometer rollback, while in reality, there may be no odometer rollback. Applicants have discovered that a closer inspection of the vehicle's history tends to indicate that in some instances, there is no such rollback. In those instances, the odometer discrepancy between odometer readings is often caused by some inadvertent error, such as a clerical error, or poor procedure at the source. These false-positive rollbacks taint what might be a good used vehicle and make it more difficult to sell the vehicle, while disappointing honest sellers.

Therefore, one advantage of the present invention is in more accurately and reliably determining and reporting the likelihood of an odometer rollback.

Another advantage of the present invention is in better informing a customer regarding the likelihood that an odometer rollback has occurred.

Still another advantage of the present invention is in minimizing the reporting of false-positive odometer rollbacks, i.e., reporting an odometer rollback where no rollback has occurred.

Correspondingly, one aspect of the present invention is a vehicle history information system adapted to accurately determine vehicle odometer rollback with reduced "false positives". In one embodiment, the system includes a vehicle history report module adapted to retrieve vehicle history records associated with a particular vehicle, at least two vehicle history records having associated date information, odometer reading, and data source information. The system further includes an odometer rollback determination module adapted to analyze the vehicle history records to determine a likelihood of an odometer rollback at least partially based on the data source information. The vehicle history information system may further include a user interface module adapted to report the determined likelihood of an odometer rollback.

In another embodiment, the odometer rollback determination module further determines whether an odometer discrepancy exists between the at least two vehicle history records, and if such odometer discrepancy exists, determines whether an odometer discrepancy qualifies as a potential odometer rollback. In one example implementation, the odometer rollback determination module determines that an odometer discrepancy qualifies as a potential odometer rollback if the odometer discrepancy is more than a predetermined number of miles.

In accordance with another embodiment of the present invention, the odometer rollback determination module is further adapted to classify data sources of the at least two vehicle history records based on the associated data source information, the classifications of data sources being indicative of level of confidence in the accuracy of the odometer readings provided by the data sources. In such an implementation, the odometer rollback determination module determines the likelihood of an odometer rollback at least partially based on the classifications of the data sources. In one embodiment, the at least two vehicle history records includes a trigger record and a target record, the target record having an associated date information that is later than the trigger record, and having an associated odometer reading that is less than the trigger record. In this regard, the vehicle history records further includes a validating record having at least associated date information that is later than the trigger record and the target record, and data source information. The odometer rollback determination module further classifies data source of the validating record, and determines the likelihood of an odometer rollback based on classification of data sources of the validating record, the trigger record, and the target record.

In one implementation, the odometer rollback determination module applies a rule based on classification of the data sources of the at least two vehicle history records in determining the likelihood of an odometer rollback. In this regard, the applied rule assigns a rollback classification tier indicating that an odometer discrepancy is likely an odometer rollback, or a false-positive odometer rollback. The system may further include a rules database adapted to retrievably store a plurality of rules that are applied by the odometer rollback determination module based on classification of the data sources associated with the at least two vehicle history records, and to also retrievably store the classification of the plurality of data sources.

In accordance with still another embodiment of the present invention, the vehicle history information system further includes a vehicle history database having vehicle history records relating to vehicle history of one or more vehicles, the vehicle history report module retrieving vehicle history records from the database. In this regard, the vehicle history records relating to vehicle history of one or more vehicles stored in the database are obtained from a plurality of data sources.

Another aspect of the present invention is a method of determining vehicle odometer rollback including retrieving vehicle history records associated with a particular vehicle, at least two vehicle history records having associated date information, odometer reading, and data source information. The method also includes analyzing the at least two vehicle history records to determine a likelihood of an odometer rollback at least partially based on the data source information.

Yet another aspect of the present invention is a computer readable storage medium including instructions for retrieving vehicle history records associated with a particular vehicle, at least two vehicle history records having associated date information, odometer reading, and data source information. In addition, the storage medium also includes instructions for analyzing the at least two vehicle history records to determine the likelihood of an odometer rollback at least partially based on the data source information.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

Figure 1:
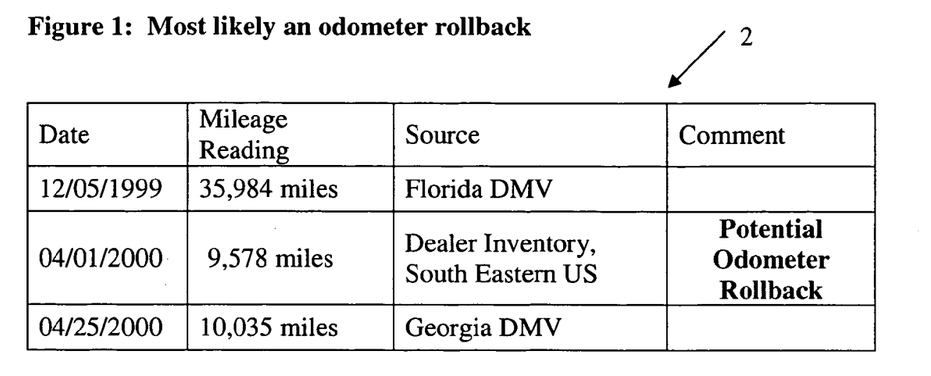
FIG. 1 illustrates example vehicle history records that show an odometer discrepancy that is most likely an odometer rollback.

As described in detail below, the system and method of the present invention incorporates a set of rules or logic to lower the risk of reporting odometer rollbacks in error so that vehicle history information providers such as CARFAX can provide more accurate rollback information to users. To explain the benefits of the present invention, example vehicle history records that show an odometer discrepancy that is likely an odometer rollback, and example vehicle history records that show an odometer discrepancy that is not likely an odometer rollback, are discussed below. The vehicle history in FIG. 1 illustrates a series of vehicle history records 2 for a particular vehicle that indicate a likely odometer rollback. In particular, the vehicle history record of Dec. 5, 1999 shows a higher mileage than the vehicle history record of Apr. 1, 2000 which is clearly an odometer discrepancy. In this case, a third independent data source, on Apr. 25, 2000, confirms a mileage reading well below the 35,984 miles first listed on Dec. 5, 1999. Therefore, an odometer rollback is likely.

Figure 2:
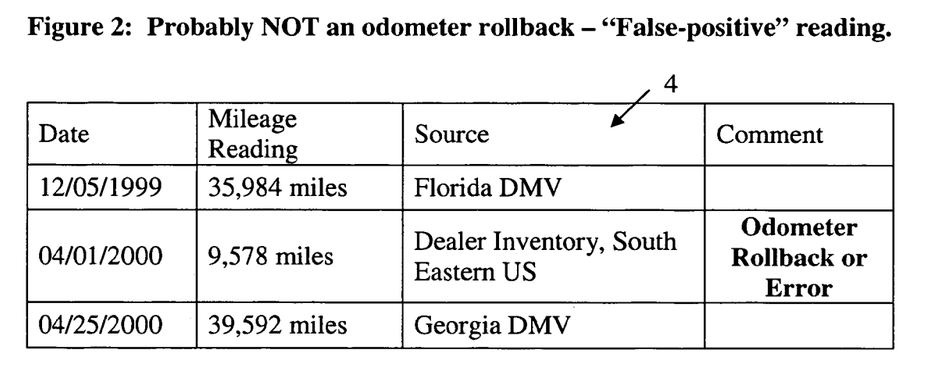
FIG. 2 illustrates example vehicle history records that show an odometer discrepancy which probably is not an odometer rollback.

However, the vehicle history in FIG. 2 illustrates a series of vehicle records 4 for another example vehicle that indicates an odometer discrepancy, but is probably not an actual odometer rollback, i.e. is a "false-positive" rollback. In analyzing the vehicle history records set forth in FIG. 2, the following information suggests that a false-positive rollback has occurred:

The source of the second record, Dealer Inventory, is often inaccurate when it comes to odometer readings.

The third record from a more reliable source (Georgia DMV) contradicts the rollback triggered by the second record.

In addition, the second and third records are only separated by 25 days; it is unlikely someone would have driven more than 30,000 miles in that short period of time.

Lastly, adding the digit "3" in front of the mileage reading in the second record to read "39,578 miles" would create a very consistent and logical mileage history.

Without the expert knowledge used above to further analyze the mileage history, the average customer could easily conclude that the vehicle in FIG. 2 has a serious problem, just as in FIG. 1, while it is likely not so.

Therefore, there exists a need to more accurately determine whether a potential odometer discrepancy or rollback is likely an actual odometer rollback, and to provide users with additional information clarifying the likelihood of a potential odometer discrepancy being an actual odometer rollback.

The present invention provides vehicle history report users additional clarity in the interpretation of mileage discrepancies by discriminating between:

Likely odometer rollbacks (referred to as Tier 1 Rollbacks)—i.e. there is a high confidence that the odometer discrepancy noted in a vehicle history report is indeed an odometer rollback.

Less likely odometer rollbacks (referred to as Tier 2 Rollbacks)—i.e. there is a lower level of confidence that the odometer discrepancy noted in the vehicle history report is an odometer rollback. A Tier 2 Rollback is better identified as a mileage inconsistency or an inconsistent odometer reading.

This added level of knowledge helps a customer decide what his/her next step is for a particular vehicle. For instance, if the vehicle's history shows a Tier 1 Rollback, the customer might decide to pass on this vehicle all together because it is likely that the mileage on this vehicle has been tampered with, and it is not worth considering buying. On the other hand, if the vehicle's history shows a Tier 2 Rollback, the customer might want to have the vehicle further inspected and/or talk about the odometer discrepancy issue with the dealer. It might be an excellent vehicle tainted by a mere clerical error.

Thus, the present invention provides a novel way of addressing the qualitative issue with regard to odometer rollbacks by creating tier categories of rollbacks, for example, those odometer rollbacks in which there is a high degree of confidence (Tier 1 Rollback), and those in which there is a low degree of confidence (Tier 2 Rollback), the details being discussed herein below.

Figure 3:
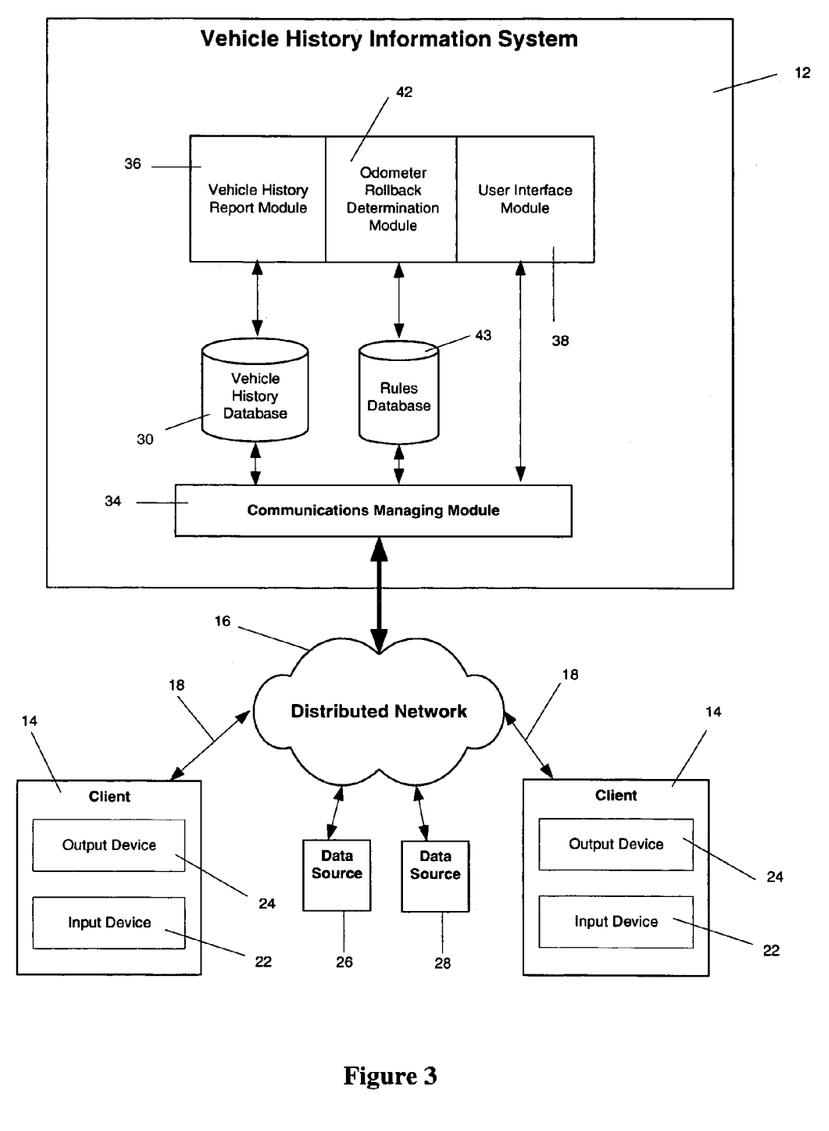
FIG. 3 is a schematic illustration of a vehicle history information system in accordance with one embodiment of the present invention having an odometer rollback determination module.

Referring again to the drawings, FIG. 3 shows a schematic illustration of a vehicle history information system 12 in accordance with one example embodiment of the present invention. Specifically, vehicle history information system 12 is computer implemented, and is adapted to exchange data with a plurality of clients 14 through data transmission across a distributed network 16, e.g. Internet. Clients 14 represent individual consumers and vehicle dealers accessing vehicle history information system 12 to obtain vehicle history information about a particular vehicle.

Distributed network 16 to which vehicle history information system 12 and clients 14 are connected may be any type of communications channel such as a local area network (LAN), wide area network (WAN), direct computer connections, and/or wireless connections using radio frequency, infrared, or other wireless technologies using any appropriate communication hardware and protocols, and may further be the Internet. Thus, clients 14 may be connected to distributed network 16 by any conventional communication links 18, including via hardwire and/or in a wireless manner.

Generally, vehicle history information system 12 may be implemented with any type of appropriate hardware and software, with portions residing in the form of computer readable storage medium having executable instructions, and computer architecture. In this regard, the vehicle history information system 12 may be implemented using a server, personal computer, a portable computer, a thin client, etc. or any combination of such devices. Vehicle history information system 12 may be a single device at a single location as shown, or multiple devices at a single, or multiple locations that are connected together using any appropriate communication protocols over any communication medium such as electric cable, fiber optic cable, any other cable, or in a wireless manner using radio frequency, infrared, or other technologies.

FIG. 3 also illustrates an example implementation of clients 14. Clients 14 may be any appropriate devices for accessing vehicle history information system 12 such as a personal computer, a portable computer, a thin client, a handheld device such as a mobile phone or PDA, and the like. Clients 14 include input device 22 and output device 24 which allow the users of clients 14 to provide information to, and receive information from, vehicle history information system 12 via distributed network 16. In this regard, input device 22 may include a keyboard, mouse, etc. as well as data input devices such as memory devices based on magnetic, optical and/or solid state technologies including disc drives, CD/DVD drives, flash memory, etc. Output device 24 may include a monitor screen, printer, etc. that allow the users of clients 14 to obtain the vehicle history information from vehicle history information system 12 as described in further detail below.

In addition, a plurality of data sources 26, 28 are connected to the vehicle listing information system 12 via the distributed network 16. The data sources 26, 28 provide information regarding one or more particular vehicles, for example, date information, data source information, and/or odometer reading. Of course, in other embodiments, the data sources 26, 28 can provide the information in other appropriate manners, via fax, etc. In addition, whereas only two data sources are shown, any number of data sources may provide vehicle listing information.

In the preferred embodiment of the present invention, vehicle history information system 12 includes vehicle history report module 36, odometer rollback determination module 42, and user interface module 38, the functions of each module being further described hereinbelow. Vehicle history information system 12 also includes vehicle history database 30 for storing vehicle history records associated with one or more vehicles, and a rules database 43 for storing data source categories and rollback classification rules as also described in detail below. These modules, vehicle history database 30, and rules database 43, are connected to communications managing module 34 for effective data communication between vehicle history information system 12 and distributed network 16. In particular, communications managing module 34 is adapted to manage communications and interactions between vehicle history information system 12 and its various components and modules, and between the vehicle history information system 12 and the various clients 14 via the distributed network 16.

Vehicle history information system 12 in accordance with the embodiment of the present invention is illustrated and discussed as having various modules noted above which perform particular functions. It should be understood that these modules are merely schematically illustrated based on their function for clarity purposes, and do not necessarily represent specific hardware or software. In this regard, these modules and other components may be hardware and/or software implemented to substantially perform their particular functions explained herein. The various functions of the different components can be combined or segregated as hardware and/or software modules in any manner, and can be used separately, or in combination. Thus, the present invention as schematically embodied in FIG. 3 should not be construed to limit vehicle history information system 12 of the present invention, but be understood to merely be a schematic example.

Vehicle history database 30 contains a plurality of vehicle history records, each of which are related to a particular vehicle. Each vehicle history records are arranged, organized, indexed and/or retrievable based on the unique vehicle identification number (VIN) of the particular vehicle. In this regard, each vehicle sold within the United States and most foreign countries has a unique VIN which is identified on nearly every vehicle title issued and physically identified on the respective vehicle. As discussed in further detail below, when a vehicle history report is requested using the vehicle history information system 12, all vehicle history records indexed by the same VIN are selected and retrieved. The VIN is the key to identifying and tracing the public record of each vehicle, and to associating different vehicle data collected from a variety of sources with the correct particular vehicle. Thus, as used herein, the phrase "particular vehicle" refers to only one physical vehicle associated with a single VIN, and does not refer to general model level information or categories of vehicles, for example, relating to a particular make, model and/or year.

Vehicle history database 30 may be any conventional database capable of effectively storing collections of vehicle history records in an organized, accessible manner, to permit efficient easy access to desired vehicle history records associated with a particular VIN, using appropriate database management system software. The information stored in vehicle history database 30 as vehicle history records may include, for example, the VIN (which indicates make, model and year); accident information, such as salvage title, junk title, flood damage, fire damage, police accident report and damage disclosure information; mileage information, such as odometer problems and actual mileage listings; title/registration events including government registration, taxi registration and commercial registration; stolen vehicle information; fleet information; emissions and safety inspection information; recall information; sale information such as sale or offer for sale by an auction or a dealer; and any other information relevant to the vehicle's history. This information is preferably used to create corresponding vehicle history reports associated with a particular VIN for retrieval, processing and/or display in the manner described below.

The vehicle history information system 12 acquires such vehicle history data from a variety of data sources 26, 28. Each item of data acquired and entered into the vehicle history database 30 is associated with a particular VIN and thus, a particular vehicle. The vehicle data is added as a record to vehicle history database and indexed by the VIN, the cumulative data forming the dataset related to a particular vehicle.

The rules database 43 may also be implemented in any appropriate manner, and functions to retrievably store the various rules which are discussed below. In addition, the rules database 43 may also be used for storing categories for the numerous data sources 26, 28 that provide data used as vehicle history records.

In the preferred embodiment, vehicle history information system 12 includes appropriate hardware and software for implementing the various modules necessary to perform the functions described herein, in particular, analyzing the vehicle information regarding a particular vehicle, and providing the results of the analysis to the user of vehicle history information system 12, for example, in a vehicle history report. In this regard, as previously noted, the vehicle history information system 12 may be implemented as a general purpose computing device with a central processing unit (CPU) or processor. The software for operating vehicle history information system 12 and of the various modules may reside in a computer readable storage medium in the form of encoded executable instructions for operating the system and performing the functionalities and process steps described herein.

Vehicle history report module 36 functions to access vehicle history database 30, and retrieve the appropriate vehicle history records associated with a particular vehicle being analyzed by vehicle history information system 12 as identified by a VIN. Thus, vehicle history report module 36 includes the appropriate software necessary to select the appropriate vehicle history records from vehicle history database 30 based on a particular request, i.e. VIN. Vehicle history report module 36 may further be adapted to arrange and organize the vehicle history records and information in a manner appropriate for further data processing, analysis and/or display so that a vehicle history report can be displayed by user interface module 38.

User interface module 38 of vehicle history information system 12 is adapted to generate a user interface for delivering the information provided by vehicle history report module 36 to output device 24 of client 14 requesting the information, and to allow the user to request such information through client 14. For example, the electronically displayable file/document may provide a vehicle history report of the particular vehicle as provided by the vehicle history report module 36 as already known in the art. In particular, the user interface module 38 of the vehicle history information system 12 allows the user to request vehicle history information by providing a VIN of the particular vehicle the user desires information about. In this regard, user interface module 38 may be implemented with an input search field to allow submission of a VIN which identifies the particular vehicle for which vehicle history information is desired to the vehicle history information system 12. Of course, submission of a VIN may be attained in any appropriate manner, for example, selection of a link.

The odometer rollback determination module 42 of the illustrated embodiment is implemented to assign each data sources 26, 28, a mileage reading confidence category, and if an odometer discrepancy exists, to determine whether the odometer discrepancy is indicative of an actual odometer rollback. In one embodiment, this determination may be based on the confidence categories of the data sources providing the mileage readings, where a particular data source sits in the sequence of mileage readings, and the mileage history following the odometer discrepancy. The odometer discrepancy is then classified, for example, as either Tier 1 or Tier 2 Rollback in a two tier implementation of the present method. In this regard, the determination of the tier of the rollback may be attained by applying rules as discussed in detail below. Of course, other additional factors can be used to qualify a particular odometer discrepancy as a Tier 1 or Tier 2 rollback. In addition, more than two tiers may be used in other implementations of the present invention. However, to facilitate understanding, the described embodiment of the present invention is implemented with only two tiers.

By applying the described method and system of the present invention, more accurate statements regarding a discrepancy in mileage readings can be displayed to the user/consumer. The present invention provides more accurate mileage information to a user of the system by qualifying the degree of confidence in potential rollbacks, thereby giving additional information to buyers and sellers about a vehicle's history, and letting the user decide their next step given this degree of confidence.

Figure 4:
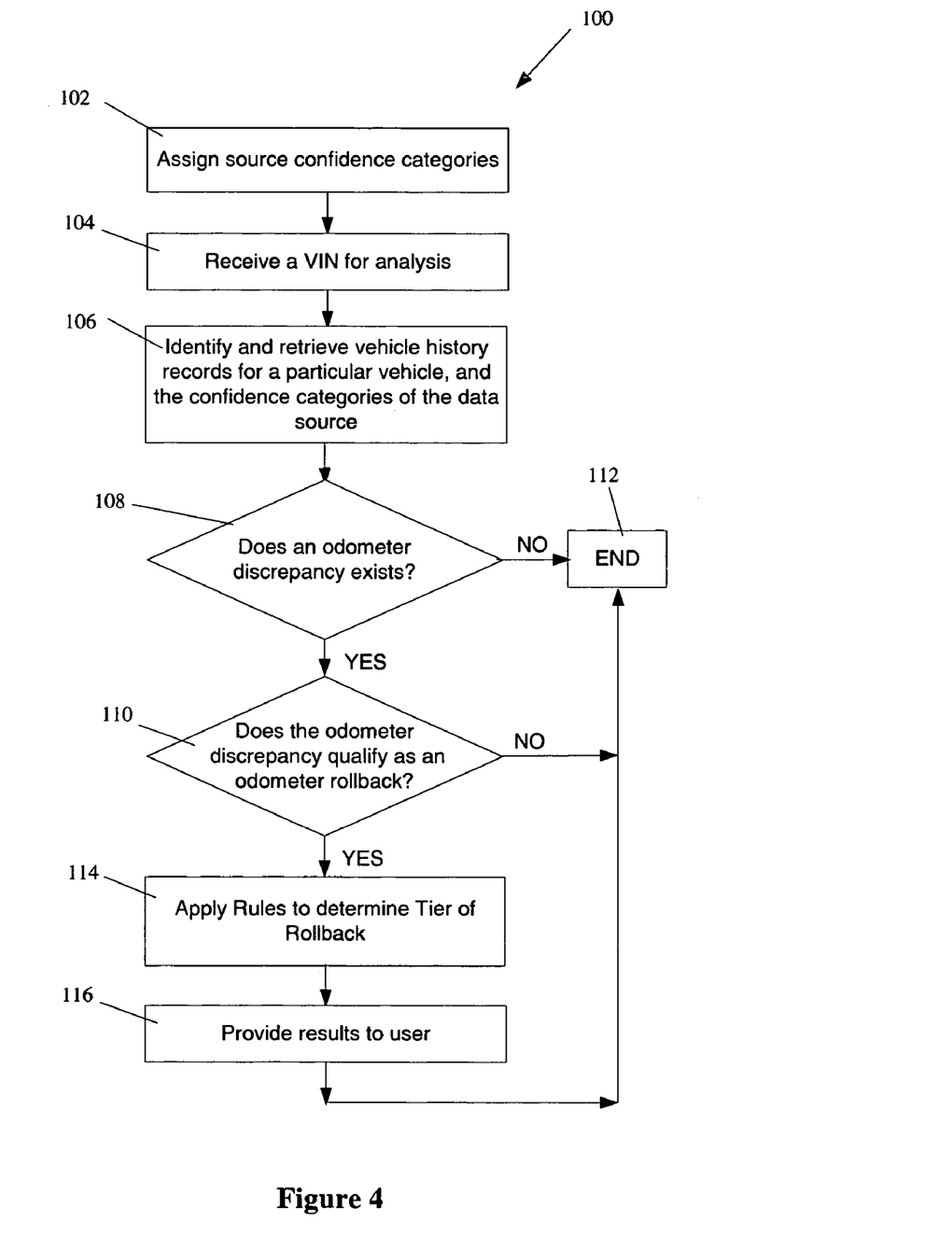
FIG. 4 is a flow diagram illustrating one example method of the present invention.

FIG. 4 is a schematic flow diagram 100 that illustrates the steps of the tiered odometer rollback method or process in accordance with one embodiment of the present invention. In step 102, a source confidence category is assigned to each data sources 26, 28 by the odometer rollback determination module 42. The assigned source confidence category corresponds to the level of accuracy of the mileage readings provided by a particular data source. Thus, all data sources are classified with regard to how confident the administrator of the vehicle history information system 12 is with the accuracy of the mileage readings reported by the data source based on, for example, the historical accuracy of the provided data.

An example key below lists each value and the definition of each value, along with examples of sources that typically fall within the defined category.

Category "A"—source with the highest confidence level: confirmed rollback from law enforcement agencies or attorney general offices (100% accuracy).

Category "B"—sources with high confidence level: states' department of motor vehicles, fleet companies (~80%+ accuracy).

Category "C"—sources with medium to low confidence level: auto auctions, emissions from certain states (35-79% accuracy).

Category "D"—sources with very low confidence level: some auto inventory, some state emissions inspections (<35% accuracy).

Of course, the above described key and data sources are merely provided as examples and other implementations of the present invention may utilize a different classification model with differing method of classification. Moreover, other implementations may include other data sources as well than those noted. The classification is applied to each of the data sources providing odometer readings to the vehicle history information system 12 to classify each data source as a A, B, C, or D data source for the purpose of odometer data accuracy. Further, new sources may be classified as they are added to provide data to the vehicle history information system 12. It should also be noted that the classification of a given source can change over time as the accuracy of its odometer data improves or deteriorates.

In step 104, the vehicle history information system 12 receives a VIN corresponding to a particular vehicle for which the vehicle history is to be analyzed. This may be attained by having the user manually enter a VIN in a search field provided by the user interface module 38, selecting a link with a VIN, or in any other appropriate manner.

In step 106, vehicle history report module 36 of the vehicle history information system 12 retrieves and assembles the records included in the vehicle history database 30 for the desired VIN, including odometer readings (if any), together with the dates odometer readings were taken, and the confidence category assigned to the data sources supplying the odometer reading as stored in the rules database 43.

In step 108, the odometer rollback determination module 42 compares each odometer reading to the previous reading and determines whether there is an odometer discrepancy. An odometer discrepancy exists when an odometer reading of a vehicle history record is less than an odometer reading of a chronologically earlier vehicle history record. If an odometer discrepancy does not exist, the odometer rollback determination module 42 terminates further analysis at step 112.

If an odometer discrepancy does exists, the odometer rollback determination module 42 determines whether this odometer discrepancy qualifies as a potential odometer rollback in step 110. Preferably, this qualification is made by determining whether the odometer discrepancy is equal or greater than a predetermined number of miles or kilometers, below which the discrepancy is not likely a rollback for the reasons discussed previously. In one embodiment, step 110 may be implemented by querying as to whether the odometer discrepancy is equal to or greater than 3,000 miles. This 3,000 miles threshold may be used to account for discrepancies due to odometer reporting with rounding-up of the numbers, and odometer reporting timing, whereby the mileage is read one day, but the date of the vehicle history report's record is days or weeks later. In addition, a person committing a fraud would get little value in rolling back an odometer by less than 3,000 miles, thus, making an odometer discrepancy of less than 3,000 miles less likely to be an actual odometer rollback. Of course, another threshold mileage value, or other qualification requirement may be used in other implementations of the present invention.

If the odometer discrepancy is not equal to or greater than 3,000 miles, then the logic executed by the odometer rollback determination module 42 is terminated in step 112, and no special potential odometer rollback mark or comment is displayed to the user by the user interface module 38 within a vehicle history report. However, if the odometer discrepancy meets the qualification requirement, for example, is equal to or greater than 3,000 miles, then the odometer rollback determination module 42 applies the rules in step 114 as discussed in detail below to determine whether the odometer discrepancy is a Tier 1 rollback where actual odometer rollback is very likely, or a Tier 2 rollback where the odometer discrepancy may, or may not, be an actual odometer rollback, based at least partially upon data source information.

Figure 5:
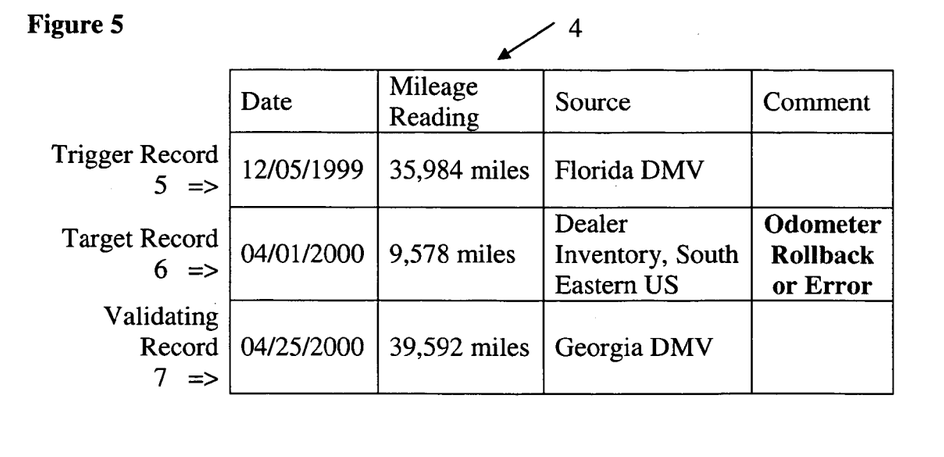
FIG. 5 illustrates the example vehicle history records of FIG. 2 with each record identified.

In the above regard, step 114 may be performed in any appropriate manner. However, in accordance with one implementation of the present invention, determination of the tier of the rollback (i.e. whether the odometer discrepancy is a Tier 1 Rollback or Tier 2 Rollback) is attained using a set of rules as set forth in Table 1 below. Prior to describing in detail the example implementation of the present invention, the specific rules as set forth in Table 1, and how the rules are applied, various terms used herein are defined below as illustrated in FIG. 5, this figure showing the vehicle history records 4 of FIG. 2.

Trigger Record—This record identified by numeral 5, is the last incremental odometer reading before a lesser odometer reading. The Trigger Record has a higher odometer reading than the record with a odometer reading following the Trigger Record (referred to as the Target Record). The Trigger Record chronologically precedes the Target Record. (See FIG. 5). However, it should be noted that other records not having an odometer reading may be between a Trigger Record and a Target Record.

Target Record—This record identified by numeral 6, is the record with an odometer reading that chronologically follows the Trigger Record. In the case of an odometer discrepancy, the Target Record has the lesser odometer reading than the Trigger Record although it has an associated date information which is later than the Trigger Record. (See FIG. 5).

Validating Records—These are the records identified by numeral 7 that chronologically immediately follow the Target Record with the lesser chronologically reading. (See FIG. 5). In one exemplary embodiment, only one validating record is used as described hereinbelow. However, additional validating records may be used in the logic of the method and software of the present invention.

Referring to Table 1 below, the set of rules that drive the classification of an odometer discrepancy to a Tier 1 Rollback, or Tier 2 Rollback uses the Trigger-Target-Validating record model described above. In addition, various other conditions may also be utilized in the set of rules of Table 1, such as odometer title brands, record sequencing, or estimated mileage readings.

TABLE 1

| Rule | Trigger Source | Target Source | Validating Record Source | Validating Rule Validating record mileage is . . . | Rollback Classification |
|---|---|---|---|---|---|
| 1 | N/A | A | N/A | N/A | 1 |
| 2 | B | B | B or C | >trigger and >target | 1 |
| 3 | B | B | B or C | <trigger and >target | 1 |
| 4 | B | C | A or B or C | <trigger and >target | 1 |
| 5 | C | B | A or B or C | <trigger and >target | 1 |
| 6 | C | C | A or B or C | <trigger and >target | 1 |
| 7 | B | C | None Available | N/A | 2 |
| 8 | B | C | B or C or D | >trigger and >target | 2 |
| 9 | C | B | None Available | N/A | 2 |
| 10 | C | B | B or C or D | >trigger and >target | 2 |
| 11 | C | C | None Available | N/A | 2 |
| 12 | C | C | B or C or D | >trigger and >target | 2 |
| 13 | A or B or C or D | A or B or C or D | N/A | If two records from two different sources have the same date (there is no trigger and target record) but show two different mileage readings | 2 |
| 14 | B or C or D | B or C or D | N/A | Post "Not Actual Mileage" branded title - supercedes other Tier 1 rules except number 1 | 2 |
| 15 | D | D | B or C or D | N/A | 2 |
| 16 | B or C | D | None Available | N/A | 2 |
| 17 | D | B or C | None Available | N/A | 2 |
| 18 | B or C | B or C | N/A | If target or trigger mileage ends in 000 | 2 |
| 19 | B | B | None Available | N/A | 1 |
| 20 | A | B | B | >trigger and >target | 1 |
| 21 | D | D | None Available | N/A | 2 |

The rules are sequentially enumerated and set forth in a tabulated form in Table 1. Columns of Table 1 set forth various conditions and rollback classifications for the corresponding rules as applied by the odometer rollback determination module 42 of the vehicle history information system 12 when determining whether an odometer discrepancy should be classified as a Tier 1 Rollback (where an odometer rollback is most likely), or a Tier 2 Rollback (where odometer rollback is not clear and the odometer discrepancy could have occurred through clerical error, or some other error). Of course, the above parameters analyzed and rules applied are merely examples of how the present invention may be implemented, and the invention is not limited to the specific rules set forth therein.

A brief description of each of the columns and the information presented therein are set forth below:

Rule column: lists rules labeled numerically.

Trigger Source column: lists the confidence classification of the Trigger Record data source.

Target Source column: lists the confidence classification of the Target Record data source.

Validating Record Source column: lists the confidence classification of the Validating Record data source.

Validating Rule column: explains the relationship between the mileage of the Trigger and Target records as compared to the Validating record.

Rollback Classification column: lists the rollback classification as Tier 1 Rollback or Tier 2 Rollback in accordance with the rule if the Validating Rule is satisfied.

Various examples that guide in understanding TABLE 1 is described herein below. For example, Rule 2 states that if the data source of the Trigger Record (Trigger Source) is classified as B, the source of the Target Record (Target Source) is classified as B, the source of the Validating Record is classified as B or C, and, in addition, the mileage of the Validating Record is greater than the mileage of the Trigger Record and the mileage of the Target Record, then the odometer discrepancy is classified as a Tier 1 Rollback which means that odometer rollback is likely.

In another example, Rule 7 states that if the source of the Trigger Record is classified as B, the source of the Target Record is classified as C, and there is no Validating Record, then the odometer discrepancy is classified as a Tier 2 Rollback which means that odometer rollback is uncertain and/or unlikely.

In yet another example, Rule 18 takes a slightly different approach in using what may be referred to as "the power of 1,000" rule. This is the scenario where an odometer reading ends in "000", indicating that the reading may have been estimated, or rounded up or down. Specifically, rule 18 states that if the source of the Trigger Record is classified as B or C, the source of the Target Record is classified as B or C, and the odometer reading of the Target Record ends in "000" (the presence or absence of a Validating Record being irrelevant, where N/A means "not applicable"), then the odometer discrepancy is classified as a Tier 2 Rollback.

It should be noted that although the above rules allow the vehicle history information system 12 to provide more accurate and reliable conclusions regarding rollbacks in an automated fashion using the odometer rollback determination module 42, the administrator of the vehicle history information system 12 may review certain results and change the classification in other implementations or examples. Thus, the administrator may use subjective judgment, perhaps based on new information or changed circumstances in certain cases, to reclassify the potential rollback, for example, from Tier 1 to Tier 2, or vice versa. Moreover, if a scenario exists which does not meet any of the pre-defined rules, the odometer discrepancy may be classified as other, and the Tier 2 Rollback flag is applied to the Target Record.

The rules set forth in Table 1 may be applied in any desired manner by the odometer rollback determination module 42 to analyze, and classify, the odometer discrepancy in the retrieved vehicle history records. However, the rules are preferably applied in the following order: 1, 13, 14, 18, 2, 3, 4, 5, 6, 7, 8, 9, 10, 11, 12, 15, 16, 17, 19, 20, 21. Preferably, verified rollbacks are checked first. Of course, additional rules may be added to those developed and set forth in Table 1 in other implementations.

Once the odometer rollback determination module 42 determines whether the odometer discrepancy (if present) is a Tier 1 Rollback or Tier 2 Rollback, the result of the determination is provided to the user of the vehicle history information system 12 via the user interface module 38 in step 116, and the logic is then terminated in step 112.

Figure 6:
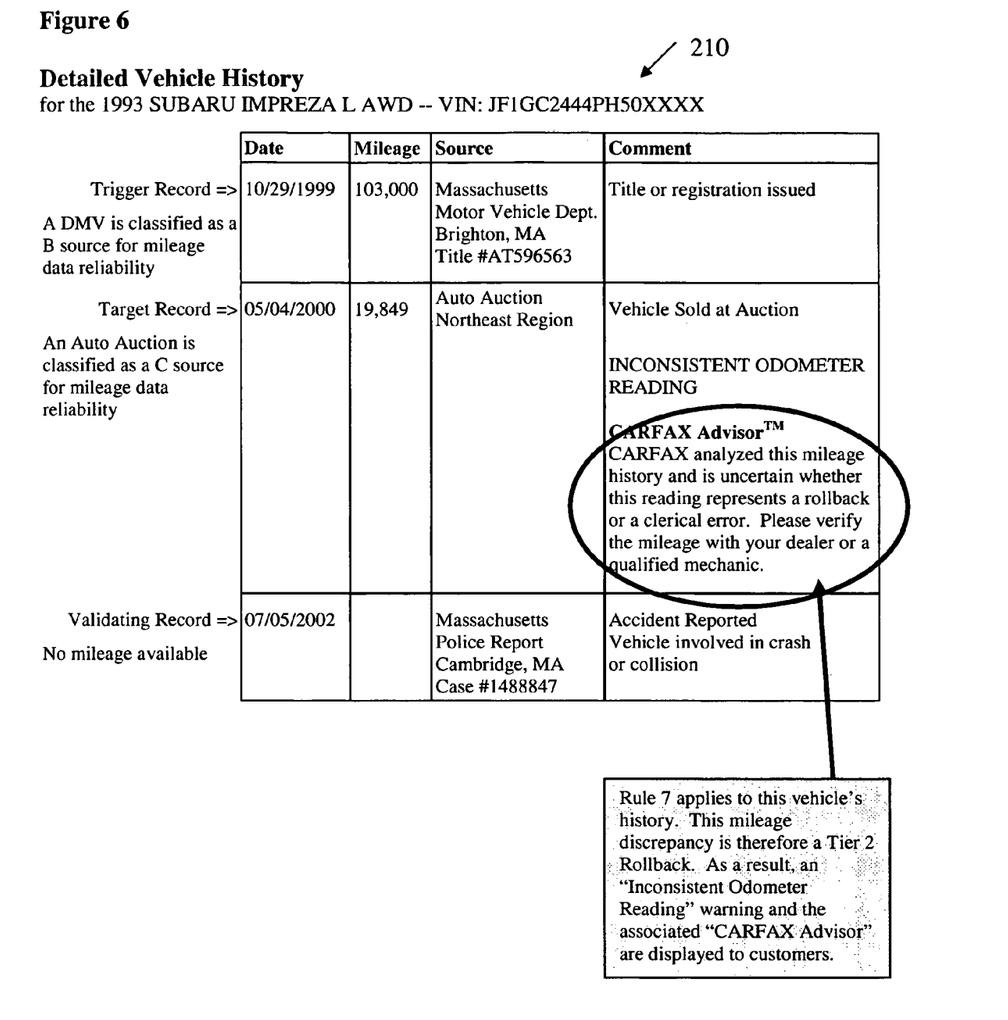
FIG. 6 illustrates a portion of a vehicle history report for an example vehicle which has been analyzed for odometer rollback.
Figure 7:
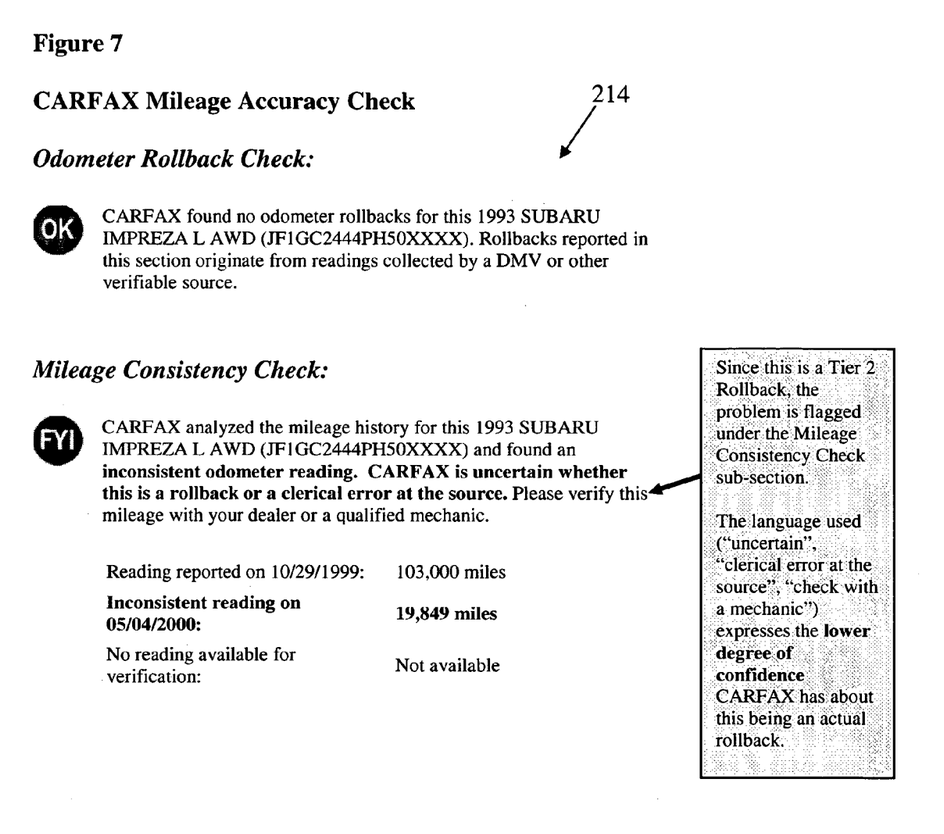
FIG. 7 illustrates another portion of the vehicle history report for the example vehicle analyzed in FIG. 6 providing the results of the analysis for odometer rollback in a text form.

In this regard, in accordance with one embodiment, the user interface module 38 displays the results differently depending on whether a Tier 1 Rollback or Tier 2 Rollback was found. In an exemplary application, FIG. 6 illustrates a Tier 2 Rollback displayed for a 1993 Subaru Impreza in a portion of an example vehicle history report 210 as determined by the vehicle history information system 12 in the manner described above. As can be appreciated, three vehicle history records were retrieved and analyzed by the odometer rollback determination module 42 to determine existence of an odometer discrepancy between the Target Record of May 4, 2000 provided by Auto Auction Northeast Region (category C data source) and the Trigger Record of Oct. 29, 1999 provided by Massachusetts Motor Vehicle Department (category B data source). The Validating Record does not provide any odometer reading information. Correspondingly, the odometer rollback determination module 42 generates a Tier 2 Rollback using Rule 7 of Table 1, the text being provided in the "Comment" section of the vehicle history report 210 advising that the vehicle history information system 12 is uncertain whether the mileage reading of a vehicle history record represents a rollback or a clerical error, and further advising verification. The above noted information regarding the Tier 2 Rollback obtained in FIG. 6 may be rendered in a more textual form in a "Mileage Accuracy Check" portion 214 of a vehicle history report 210 that is provided by the user interface module 38.

Figure 8:
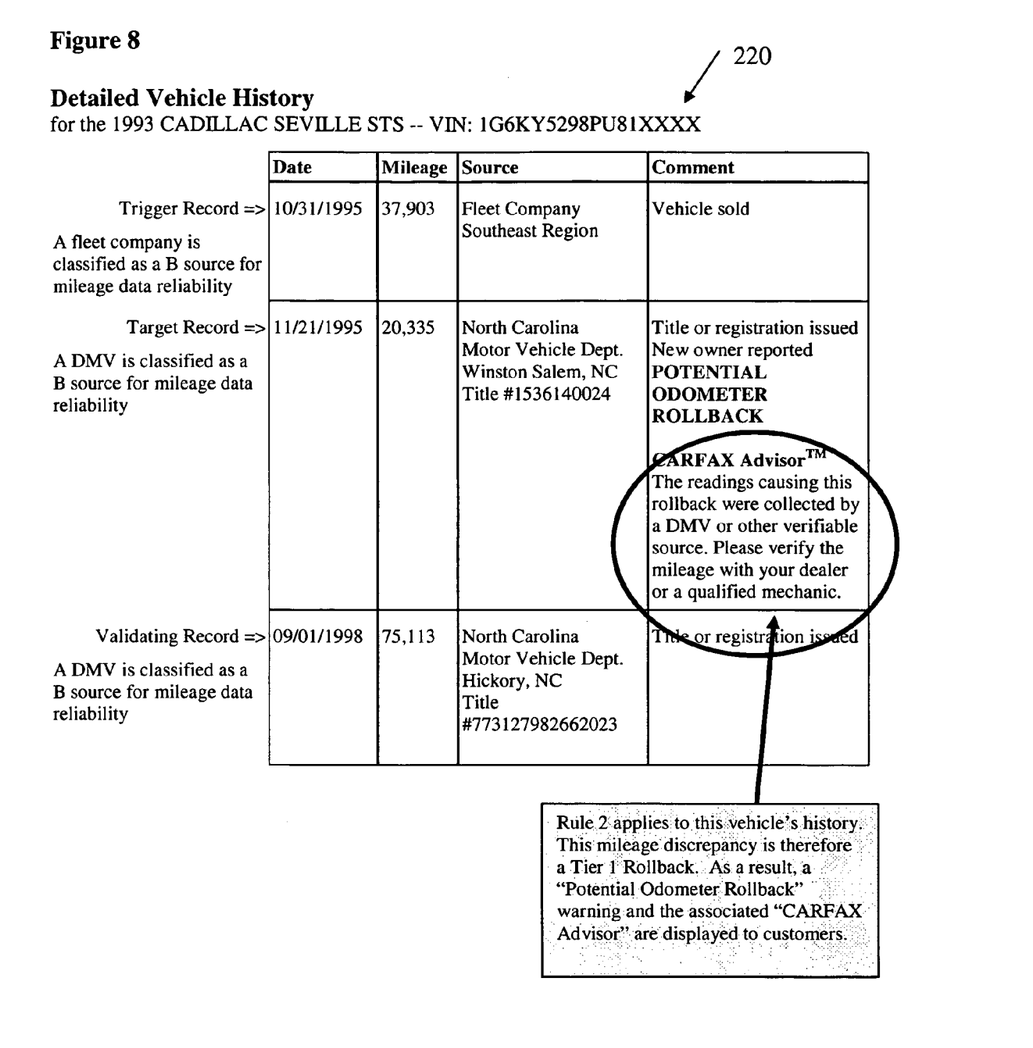
FIG. 8 illustrates a portion of a vehicle history report for a second example vehicle which has been analyzed for odometer rollback.
Figure 9:
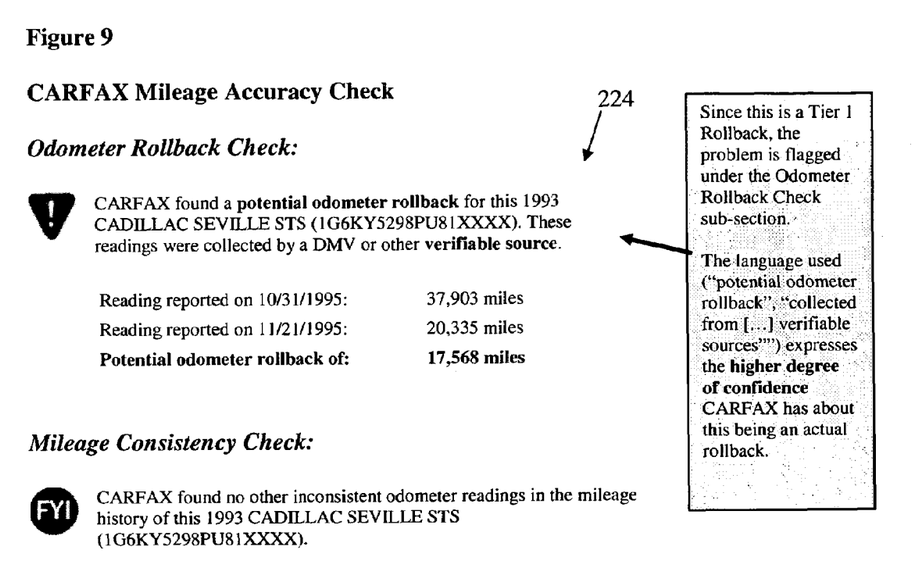
FIG. 9 illustrates another portion of the vehicle history report for the second example vehicle analyzed in FIG. 8 providing the results of the analysis for odometer rollback in a text form.

In another exemplary application, FIG. 8 illustrates a Tier 1 Rollback displayed for a 1993 Cadillac Seville STS in a portion of an example vehicle history report 220 as determined by the odometer rollback determination module 42 of the vehicle history information system 12. Again, three vehicle history records were retrieved and analyzed by the odometer rollback determination module 42 to determine existence of an odometer discrepancy between the Target Record of Nov. 21, 1995 provided by the North Carolina Motor Vehicle Department (category B data source), and the Trigger Record of Oct. 31, 1995 provided by a fleet company (category B data source). The Validating Record of Sep. 1, 1998 also provided by the North Carolina Motor Vehicle Department provides an odometer reading that is greater than both the Trigger Record and the Target Record. Correspondingly, the odometer rollback determination module 42 generates a Tier 1 Rollback using Rule 2 of Table 1, text being provided in the "Comment" section of the vehicle history report 220 advising that the vehicle history information system 12 detected a rollback, and that the mileage should be verified with the dealer or a qualified mechanic. The above noted information regarding the Tier 1 Rollback obtained in FIG. 8 may be rendered in a more textual form in a "Mileage Accuracy Check" portion 224 as shown in FIG. 9 that is provided by the user interface module 38 within the vehicle history report 22.

The text that is provided in the "Comment" portion or the "Mileage Accuracy Check" portion of the vehicle history report may be stored in the rules database 43, and be retrieved by the odometer rollback determination module 42 for inclusion in the vehicle history report provided by the user interface module 38.

In view of the above, it should be evident how the present invention lowers the incidences of reporting odometer rollbacks in error so that vehicle history information providers such as CARFAX can provide more accurate rollback information to users. As described above, this is attained by providing tiered classification of rollback, this classification being attained by categorizing the data sources, and analyzing various records of the vehicle history through application of rules developed to classify determined odometer rollback.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A vehicle history information system adapted to determine vehicle odometer rollback comprising:
   a vehicle history report module adapted to retrieve vehicle history records associated with a particular vehicle, at least two vehicle history records having associated date information, odometer reading, and data source information, said data source information being indicative of a level of accuracy of odometer data provided by a data source; and
   an odometer rollback determination module is adapted to determine whether an odometer discrepancy exists between said at least two vehicle history records, determines whether an odometer discrepancy qualifies as a potential odometer rollback, and analyze said at least two vehicle history records to determine a likelihood of an odometer rollback at least partially based on a confidence in the data source providing accurate odometer data.

2. A vehicle history information system adapted to determine vehicle odometer rollback comprising:
   a vehicle history report module adapted to retrieve vehicle history records associated with a particular vehicle, at least two vehicle history records having associated date information, odometer reading, and data source information; and
   an odometer rollback determination module adapted to classify data sources of said at least two vehicle history records using said data source information corresponding to the level of confidence in accuracy of odometer reading provided by said data sources, and determine the likelihood of an odometer rollback at least partially based on the classifications of the data sources of said at least two vehicle history records.

3. A method of determining vehicle odometer rollback comprising:
   retrieving vehicle history records associated with a particular vehicle, at least two vehicle history records having associated date information, odometer reading, and data source information, said data source information being indicative of a level of accuracy of odometer data provided by a data source;
   determining whether an odometer discrepancy exists between said at least two vehicle history records;
   determining whether an odometer discrepancy qualifies as a potential odometer rollback; and analyzing said at least two vehicle history records to determine a likelihood of an odometer rollback at least partially based on a confidence in the data source providing accurate odometer data.

4. A computer readable storage medium comprising:
instructions for retrieving vehicle history records associated with a particular vehicle, at least two vehicle history records having associated date information, odometer reading, and data source information, said data source information being indicative of a level of accuracy of odometer data provided by a data source;
instructions for determining whether an odometer discrepancy exists between said at least two vehicle history records;
instructions for determining whether an odometer discrepancy qualifies as a potential odometer rollback; and
instructions for analyzing said at least two vehicle history records to determine a likelihood of an odometer rollback at least partially based on a confidence in the data source providing accurate odometer data.

5. A vehicle history information system adapted to determine vehicle odometer rollback comprising:
a vehicle history report module adapted to retrieve vehicle history records associated with a particular vehicle, at least two vehicle history records having associated date information, odometer reading, and data source information, said data source information being indicative of a level of accuracy of odometer data provided by a data source; and
an odometer rollback determination module adapted to analyze said at least two vehicle history records to determine a likelihood of an odometer rollback at least partially based on said data source information,
wherein said odometer rollback determination module is further adapted to classify data sources of said at least two vehicle history records based on the associated data source information, the classifications of data sources being indicative of level of confidence in accuracy of odometer reading provided by the data sources.

6. A method of determining vehicle odometer rollback comprising:
retrieving vehicle history records associated with a particular vehicle, at least two vehicle history records having associated date information, odometer reading, and data source information, said data source information being indicative of a level of accuracy of odometer data provided by a data source; and
analyzing said at least two vehicle history records to determine a likelihood of an odometer rollback at least partially based on said data source information,
further including classifying data sources of said at least two vehicle records on the associated data source information, the classifications of data sources being indicative of level of confidence in accuracy of odometer reading provided by the data sources.

7. A computer readable storage medium comprising:
instructions for retrieving vehicle history records associated with a particular vehicle, at least two vehicle history records having associated date information, odometer reading, and data source information, said data source information being indicative of a level of accuracy of odometer data provided by a data source; and
instructions for analyzing said at least two vehicle history records to determine a likelihood of an odometer rollback at least partially based on said data source information,
further including instructions for classifying data sources of said at least two history records based on the associated data source information, the classifications of data sources being indicative of level of confidence in accuracy of odometer reading provided by the data sources.

8. The vehicle history information system of claim 1, wherein said odometer rollback determination module determines that an odometer discrepancy qualifies as a potential odometer rollback if the odometer discrepancy is more than a predetermined number of miles.

9. The vehicle history information system of claim 5, wherein said odometer rollback determination module determines the likelihood of an odometer rollback at least partially based on the classifications of the data sources.

10. The vehicle history information system of claim 9, wherein said at least two vehicle history records includes a trigger record and a target record, said target record having an associated date information that is later than said trigger record, and having an associated odometer reading that is less than said trigger record.

11. The vehicle history information system of claim 10, wherein said at least two vehicle history records further includes a validating record having at least associated date information and data source information, said validating record having an associated date information that is later than said trigger record and said target record.

12. The vehicle history information system of claim 11, wherein said odometer rollback determination module further classifies data source of said validating record, and determines the likelihood of an odometer rollback based on classification of data sources of said validating record, said trigger record, and said target record.

13. The vehicle history information system of claim 9, wherein said odometer rollback determination module applies a rule based on classification of the data sources of said at least two vehicle history records in determining the likelihood of an odometer rollback.

14. The vehicle history information system of claim 13, wherein the applied rule assigns a rollback classification tier indicating that an odometer discrepancy is an odometer rollback or a false-positive odometer rollback.

15. The vehicle history information system of claim 13, further including a rules database adapted to retrievably store a plurality of rules that are applied by said odometer rollback determination module based on classification of the data sources associated with the at least two vehicle history records.

16. The vehicle history information system of claim 15, wherein said rules database is further adapted to retrievably store said classification of said plurality of data sources.

17. The vehicle history information system of claim 1, further including a vehicle history database having vehicle history records relating to vehicle history of one or more vehicles, said vehicle history report module retrieving vehicle history records from said database.

18. The vehicle history information system of claim 17, wherein said vehicle history records relating to vehicle history of one or more vehicles stored in said database are obtained from a plurality of data sources.

19. The vehicle history information system of claim 1, further including a user interface module adapted to report the determined likelihood of an odometer rollback.

20. The vehicle history information system of claim 2, wherein said at least two vehicle history records includes a trigger record and a target record, said target record having an associated date information that is later than said trigger record, and having an associated odometer reading that is less than said trigger record.

21. The vehicle history information system of claim 20, wherein said at least two vehicle history records further includes a validating record having at least associated date information that is later than said trigger record and said target record and data source information, said odometer rollback determination module further classifying data source associated with said validating record, and determining the likelihood of an odometer rollback based on classification of data sources of said validating record, said trigger record, and said target record.

22. The vehicle history information system of claim 21, wherein said odometer rollback determination module applies a rule based on classification of the data sources of said validating record, said trigger record, and said target record to determine the likelihood of an odometer rollback, said applied rule assigning a rollback classification tier indicating that an odometer discrepancy is an odometer rollback or a false-positive odometer rollback.

23. The method of claim 3, wherein an odometer discrepancy qualifies as a potential odometer rollback if the odometer discrepancy is more than a predetermined number of miles.

24. The method of claim 6, wherein determination of the likelihood of an odometer rollback is at least partially based on the classifications of the data sources.

25. The method of claim 24, wherein said at least two vehicle history records includes a trigger record and a target record, said target record having an associated date information that is later than said trigger record, and having an associated odometer reading that is less than said trigger record.

26. The method of claim 25, wherein said at least two vehicle history records further includes a validating record having at least associated date information and data source information, said validating record having an associated date information that is later than said trigger record and said target record.

27. The method of claim 26, further including classifying source of said validating record, and determining of the likelihood of an odometer rollback is based on classification of data sources of said validating record, said trigger record, and said target record.

28. The method of claim 24, further including application of a rule based on classification of the data sources of said at least two vehicle history records in determining the likelihood of an odometer rollback.

29. The method of claim 28, wherein the applied rule assigns a rollback classification tier indicating that an odometer discrepancy is an odometer rollback or a false-positive odometer rollback.

30. The method of claim 28, further including providing a rules database adapted to retrievably store a plurality of rules that are applied by said odometer rollback determination module based on classification of the data sources associated with the at least two vehicle history records.

31. The method of claim 30, wherein said rules database is further adapted to retrievably store said classification of said plurality of data sources.

32. The method of claim 3, further including providing a vehicle history database having vehicle history records relating to vehicle history of one or more vehicles.

33. The method of claim 32, wherein said vehicle history records relating to vehicle history of one or more vehicles stored in said vehicle history database are obtained from a plurality of data sources.

34. The method of claim 3, further including reporting the determined likelihood of an odometer rollback.

35. The storage medium of claim 4, wherein an odometer discrepancy qualifies as a potential odometer rollback if the odometer discrepancy is more than a predetermined number of miles.

36. The storage medium of claim 7, wherein determination of the likelihood of an odometer rollback is at least partially based on the classifications of the data sources.

37. The storage medium of claim 36, wherein said at least two vehicle history records includes a trigger record and a target record, said target record having an associated date information that is later than said trigger record, and having an associated odometer reading that is less than said trigger record.

38. The storage medium of claim 37, wherein said at least two vehicle history records further includes a validating record having at least associated date information and data source information, said validating record having an associated date information that is later than said trigger record and said target record.

39. The storage medium of claim 38, further including instructions for classifying source of said validating record, and determining the likelihood of an odometer rollback is based on classification of data sources of said validating record, said trigger record, and said target record.

40. The storage medium of claim 36, further including instructions for application of a rule based on classification of the data sources of said at least two vehicle history records in determining the likelihood of an odometer rollback.

41. The storage medium of claim 40, wherein the applied rule assigns a rollback classification tier indicating that an odometer discrepancy is an odometer rollback or a false-positive odometer rollback.

42. The storage medium of claim 40, further including a rules database adapted to retrievably store a plurality of rules that are applied by said odometer rollback determination module based on classification of the data sources associated with the at least two vehicle history records.

43. The storage medium of claim 42, wherein said rules database is further adapted to retrievably store said classification of said plurality of data sources.

44. The storage medium of claim 4, further including a vehicle history database having vehicle history records relating to vehicle history of one or more vehicles.

45. The storage medium of claim 44, wherein said vehicle history records relating to vehicle history of one or more vehicles stored in said vehicle history database are obtained from a plurality of data sources.

46. The storage medium of claim 4, further including instructions for reporting the determined likelihood of an odometer rollback.

* * * * *